April 27, 1943.  W. P. GRUENDLER  2,317,909
CAGE FOR GRINDING MACHINES AND THE LIKE
Filed May 25, 1942
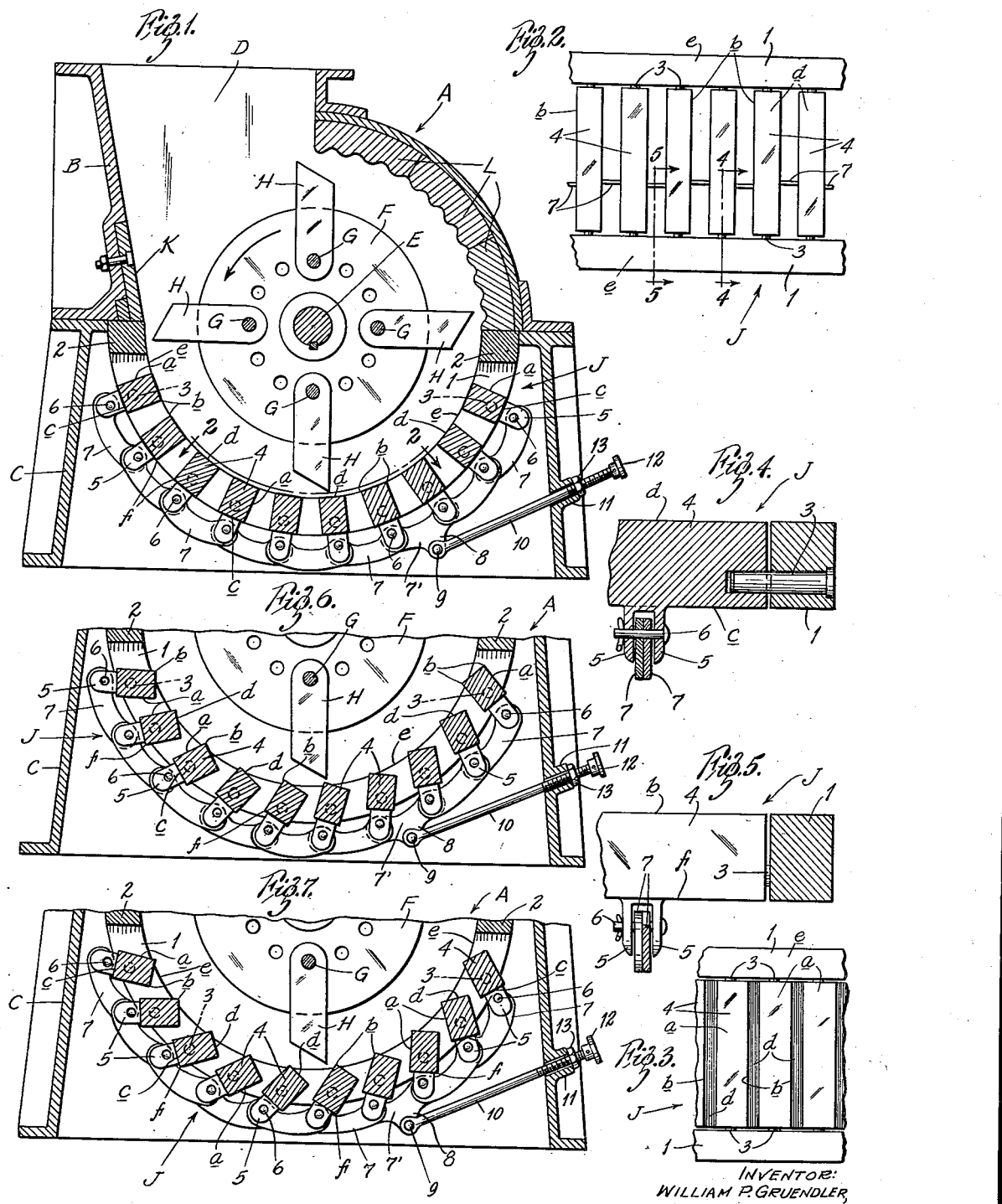
INVENTOR:
WILLIAM P. GRUENDLER
ATTORNEY.

Patented Apr. 27, 1943

2,317,909

UNITED STATES PATENT OFFICE 2,317,909

CAGE FOR GRINDING MACHINES AND THE LIKE

William P. Gruendler, University City, Mo., assignor to Gruendler Crusher & Pulverizer Co., St. Louis, Mo., a corporation of Missouri Application May 25, 1942, Serial No. 444,334

1 Claim. ((Cl. 83—11)

This invention relates to a certain new and useful improvement in machines for the crushing, pulverizing, disintegrating, grinding, shredding, or otherwise reducing stone, coal, scrap, sewage, and other products and materials.

Such machines comprise an arcuate or segmental grate or cage co-operable with the hammers or other material-reducing members of the machine and through which the reduced material passes or is discharged from the machine.

My present invention has for its object the provision of a grate or cage comprising a series of individually pivoted bars so uniquely formed or contoured and connected one with the other that the several bars may be readily and conveniently rocked or oscillated in unison for adjustment and co-operation the one with the other and with the material reducing members of the particular machine for selectively varying the spacing therebetween for correspondingly regulating the degree of fineness to which the material is to be reduced for discharge through the grate or cage.

My invention has for another object the provision of a grate or cage of the kind and for the purpose stated, which may be readily constructed, which may be conveniently installed in the particular machine, which may be manipulated with ease and facility, and which is exceedingly efficient in the performance of its intended functions.

And with the above and other objects in view, my invention resides in the novel features of form, construction, arrangement, and combination of parts presently described and pointed out in the claim.

In the accompanying drawing,—

Figure 1 is a vertical longitudinal sectional view of a pulverizing or other material-reducing machine equipped with an adjustable grate or cage constructed in accordance with and embodying my invention;

Figure 2 is a fragmental plan view of the grate taken approximately on the line 2—2, Figure 1, and looking in the direction of the arrows, and illustrating the grate-bars in so-called fully open or most widely spaced relation;

Figure 3 is a similar view, illustrating the grate-bars in so-called fully closed or impinging or abutting relation;

Figures 4 and 5 are enlarged detail sectional views taken, respectively, on the lines 4—4 and 5—5, Figure 2; and Figures 6 and 7 are fragmentary sectional views of the machine, illustrating the grate-bars in adjusted selectively spaced intermediate positions for varying the spacing therebetween for correspondingly controlling the degree of fineness to which the material is to be reduced prior to discharge from the machine.

Referring now in more detail and by reference characters to the drawing, which illustrates a preferred embodiment of my invention, A designates a grinding, pulverizing, or other material-reducing machine, which, briefly for present purposes described, includes a shell or casing section B supported on suitable framework C and having a hopper D. Rotatable within the machine in operative relation to the hopper D, is a material-reducing unit comprising a shaft E, a series of spaced disks F fixed on the shaft E, an annular series of rods G fixed on the disks F in spaced parallel relation to the shaft E, and series of hammers or other reducing members H pivotally hung or suspended on the rods G. Suitably mounted or installed upon the framework C in shell completing co-operation with the upper shell or casing section B and for material-reducing co-operation with the hammers or the like H, is a grate or cage J of my invention, the casing-section B being provided upon a portion of its inner face with renewable breaker plates K and L, for facilitating material reduction, as will be well understood.

The cage J, in turn, includes a frame approximately of semi-circular contour in elevation made up of correspondingly shaped side bars or rails I, I, rigidly joined at their ends by interposed cross-bars or rails 2, the cage J being, as a unit, of such selected size and dimensions for shell-completing cooperation, as I have mentioned, with the upper shell-section B of the particular machine.

Disposed or mounted in the bars I in selected spaced relation and in opposed registering pairs, are suitable pivot-pins 3, and disposed in parallel relation transversely between the side-rails I and each engaged at its opposite ends by a registering pair of the pins 3, as best seen in Figure 4, for bodily or axial rocking or oscillating movement, is a series of grate-bars 4.

The grate-bars 4 are each preferably of oblong-rectangular contour and correspondingly rectangular in cross-section, each bar 4 being constructed preferably of suitable metallic material and having flat side faces $a$ and more or less sharp corners $b$, substantially as shown and for purposes presently appearing.

Each of the bars 4 is formed or provided on its outwardly presented flat face $c$ with a companion pair of outwardly presented spaced ears or lugs 5, which are disposed in an aligning series throughout the series of bars 4, and fitting at their ends between, and pivotally, as by means of pins or the like 6, attached to, the ears 5, is a series of rigid links 7 preferably having the somewhat arcuate form in side elevation best seen in Figures 1, 5, and 6, the intermediate links 7, of course, overlapping at their respective inner ends between the corresponding intermediate ears 5, as best seen in Figures 4 and 5.

A selected preferably intermediate link, as, for instance, link 7', is provided with an outwardly presented ear or extension 8, to which at one end, as by means of a pin 9, is pivotally connected a rod 10, which extends obliquely upwardly and outwardly through a suitably bored boss or enlargement 11 provided for the purpose on the machine framework C, and which at its free or outer end is equipped with a suitable manipulating member 12.

It may be here stated that the several bars 4 are so link-connected in series one with the other that, when the bars 4 are at one limit of their rocking movement or in the so-called fully closed or normal position thereof illustrated in Figure 3, the bars 4 at their inner flat faces $d$ are disposed obliquely to the inner circumferential face $e$ of the rails 1 and also obliquely angularly disposed to the path of rotation of the hammers or other material-reducing members H, and with their straight edges $b$ presented angularly toward and for full reducing co-operation with, the members H and with the one bar 4 at the opposite or inner marginal portion of its one side face $a$ impinging or engaging upon a side face $a$ of an adjacent bar 4.

However, it will be evident that, as the rod 10 is pulled outwardly of the framework C, the bars 4 will, as a series or in unison, be correspondingly rocked or oscillated on their respective pivots 3 and the spacing therebetween, as indicated in Figures 6 and 7, for the discharge of the reduced material from the machine correspondingly enlarged. At the same time, the sharp corners $b$ of the several bars 4 are shifted away, and their inner flat faces $d$ shifted toward, as it may be said, the hammers or other material-reducing members H, a correspondingly smoother breaking face being hence presented to the hammers H for decreasing their reducing effect upon the material being worked.

Thus, as the bars 4 are rocked from their fully closed, abutting, or normal position, as illustrated in Figure 3, to their fully open or most widely spaced position, as illustrated in Figure 2, in which latter position the bars 4 at their inner flat faces $d$ are substantially concentric with the inner circumferential face $e$ of the rails 1 and with the axis of shaft E, the degree of fineness to which the material is reduced by the hammers H in co-operation with the cage J is selectively decreased and concurrently the spacing between the bars 4 is increased for permitting such greater particles to discharge from the machine.

In such manner, as the rod 10 is shifted inwardly or outwardly of the machine, the cage bars 4 are selectively rockably shifted for varying or regulating the degree of fineness to which the material is to be reduced to discharge from the particular machine through the cage J, the bars 4 and rod 10 being secured in a selected rocked or adjusted position as by means of a nut 13 threaded on the rod 10 for engaging the boss 11, as best seen in Figures 1, 6 and 7, and the arcuate form or contour of the links 7, 7', accommodating the outer sharp corners $f$ of the several bars 4 when the latter are in fully closed or normal position.

The grate is simple in structure and fulfills in every respect the objects stated, and it should be understood that changes and modifications in the form, construction, arrangement, and combination of the several parts of the grate may be made and substituted for those herein shown and described without departing from the nature and principle of my invention, except as limited by the appended claim.

Having thus described my invention, what I claim and desire to secure by Letters Patent is,—

In a machine of the class described, in combination with a rotatable series of hammers, a cage comprising a frame including a pair of spaced side rails lengthwise arcuate in contour, a series of bars disposed transversely between and at their ends independently pivotally connected for rocking movement to said rails, each of said bars being of oblong-rectangular contour, and means including links arcuate in side elevation having pivoted connection with and at the respective outer faces of the bars for maintaining the bars in operative relation and for rocking the bars in unison for adjustably spacing said bars one from the other and varying the angularity of their inner faces with respect to the hammers for regulating the degree of fineness of the material being operated upon and discharging from the machine, said bars, when in normal position, being presented with their respective inner faces obliquely disposed to said rails and with one bar at a corner thereof in cage-closurewise-engagement with a side face of an adjacent bar and with the inner faces of the several bars extending obliquely to said hammers for increasing their material reducing co-operation therewith and said bars, when in full abnormal position, being presented with their said inner faces approximately concentric the one with the other for decreasing their material reducing co-operation with the hammers and at their side faces most widely spaced the one from the other for opening the cage to greatest degree for permitting material of greatest size to discharge between the bars.

WILLIAM P. GRUENDLER.